United States Patent [19]

Eisenmann et al.

[11] 4,224,859
[45] Sep. 30, 1980

[54] AXIAL PISTON MACHINE

[75] Inventors: Siegfried Eisenmann, Aulendorf; Dieter Hancke, Sigmaringendorf-Laucherthal, both of Fed. Rep. of Germany

[73] Assignee: Fuerstlich Hohenzollernsche Huettenverwaltung, Lauchertal, Lauchertal-Sigmaringen, Fed. Rep. of Germany

[21] Appl. No.: 28,492

[22] Filed: Apr. 9, 1979

[30] Foreign Application Priority Data

Apr. 10, 1978 [DE] Fed. Rep. of Germany ....... 2815476

[51] Int. Cl.³ ............................................. F01B 13/04
[52] U.S. Cl. ........................................... 91/488; 91/489
[58] Field of Search ................................. 91/486–489

[56] References Cited

U.S. PATENT DOCUMENTS

| 1,817,063 | 8/1931 | Carrie et al. | 91/487 |
| 2,155,455 | 4/1939 | Thoma | 91/488 |
| 3,721,161 | 3/1973 | Bobst | 91/486 |
| 3,789,740 | 2/1974 | Boyer | 91/486 |
| 3,862,588 | 1/1975 | Bahrle et al. | 91/486 |

Primary Examiner—William L. Freeh
Attorney, Agent, or Firm—Michael J. Striker

[57] ABSTRACT

The axial piston machine, such as an engine or a pump, comprises a radial hydrostatic bearing for the drive shaft in the form of an oil gap between a conical shaft portion and a corresponding conical boring in a bearing block. The gap has a plurality of bearing pockets normally supplied with high-pressure oil via throttling means communicating with the high-pressure oil. An auxiliary axial hydrostatic bearing in the form of a bearing gap defined between the face of the bearing block near the tapering end of the bearing body and a radial extension of the drive shaft is supplied with an auxiliary low-pressure oil having an approximately constant pressure. A self-adjustable pressure chamber is provided in a plane parallel to the axial hydrostatic bearing gap and is defined by a collar supported on the drive shaft opposite the first radial extension and communicating with the axial bearing gap via a conduit. The pump for the auxiliary low pressure communicates with the pump for the operative high pressure via non-return valves so as to prevent return flow when the auxiliary pressure fluid has a higher pressure than the operational pressure fluid.

10 Claims, 2 Drawing Figures

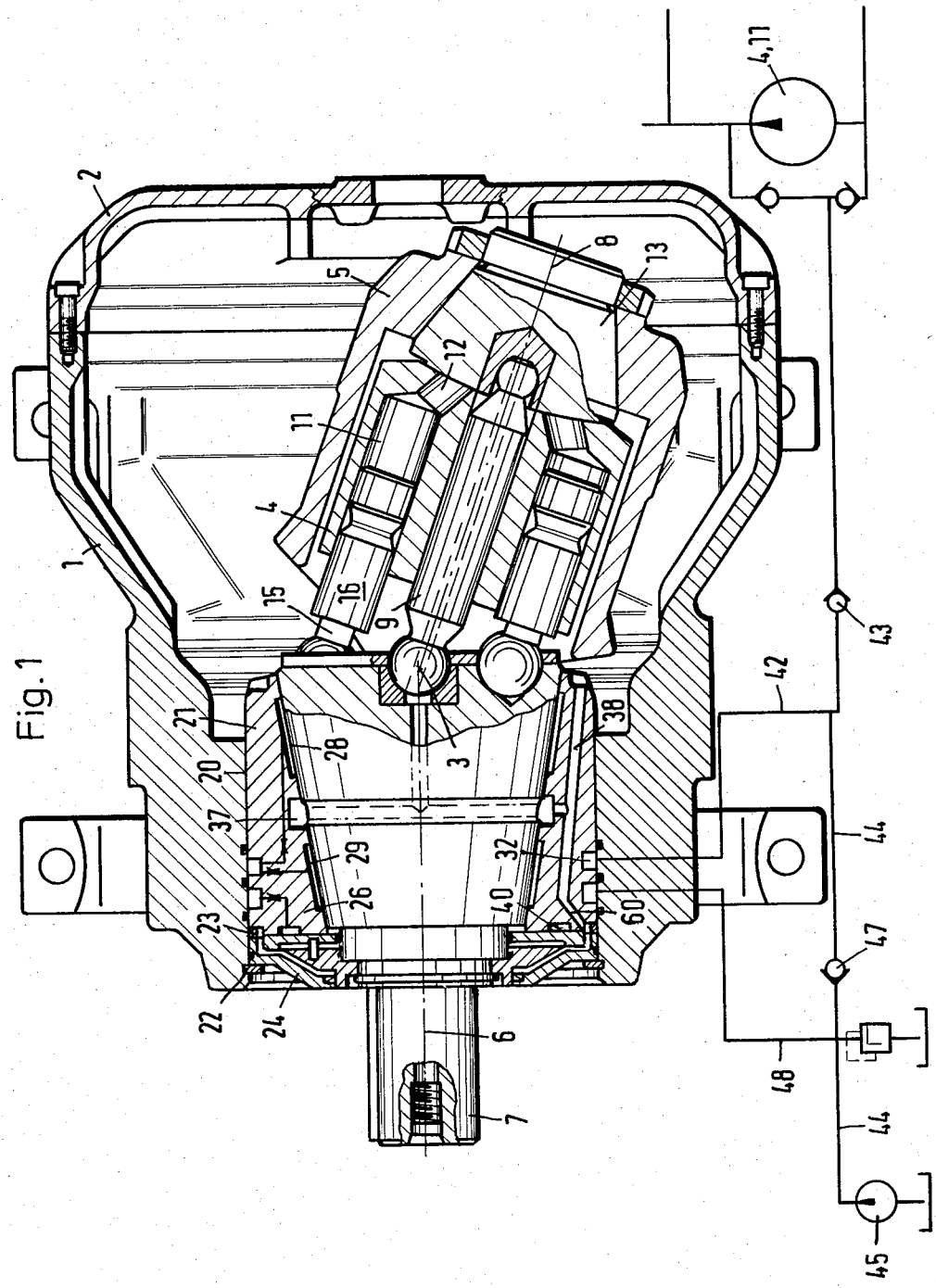

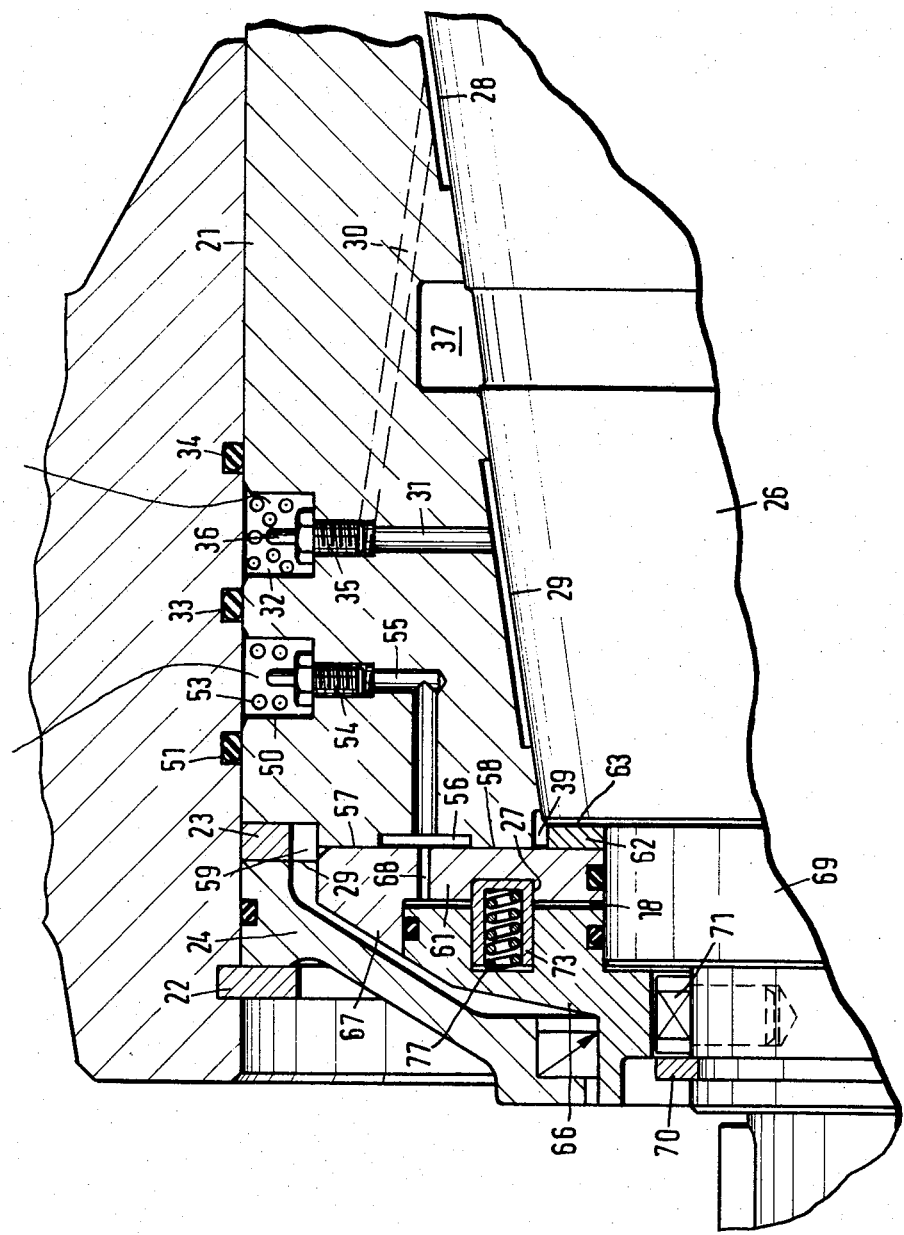

AXIAL PISTON MACHINE

BACKGROUND OF THE INVENTION

This invention relates to an axial piston machine and in particular it relates to an axial piston machine or pump including a drive shaft, a socket ring provided on the end face of the drive shaft, a rotary cylinder block having its axis of rotation inclined relative to the axis of the drive shaft, a plurality of pistons arranged for axial displacement in the cylinder block and being linked to the socket ring. The inclined position of the rotary cylinder block can be fixed or preferably can be made adjustable to control the displacement or strokes of the pistons.

The machines of this kind which are known as "Thoma" pumps, have a compact structure and by virtue of a complete hydraulic compensation of axial forces in the driving mechanism they are suitable for operation under extremely high pressures.

In conventional axial piston machines the inner face of the drive shaft is extended to form a socket ring for receiving ball-shaped ends of piston rods, thus forming universal ball-and-socket joints for the pistons. The opposite ends of the axial piston rods are tiltably linked to the pistons in the cylinder block. The cylinder block is rotatably supported in a barrel to rotate about an axis which intersects the axis of the drive shaft. To vary the strokes of the pistons, the barrel together with the block is tiltable about an axis which intersects the plane of the ball-and-socket joints of the socket ring on the drive shaft. In this plane is also situated the intersection point of the drive shaft axis with the cylinder barrel axis. By increasing the inclination of the cylinder block relative to the axis of the drive shaft, the stroke of the pistons is increased. Conventionally, the maximum angle of this inclination is about 27°.

Inasmuch as the piston rods are positively linked both to the pistons and to the drive shaft by universal joints, the movement of the pistons is enforced not only on the pressure side of the cylinder block when the pistons are forced outwardly by the pressure fluid, but also at the discharge or suction side when the pistons move inwardly.

For supporting the rotary part of such axial piston machines, especially in the case of axial piston pumps, radial and thrust roller bearings have almost without exception been employed for the drive shaft.

Due to the forceful and shock-like operation of the axial piston machines of this kind and also in view of the requirements for maximum adjustability of the tilting angle of the cylinder block relative to the drive shaft, the bearing strength, the wear resistance and the accuracy of the bearings for the drive shaft have to be extremely high.

Despite great effort to fulfill these requirements, the working life of such roller bearings is very short and this fact is only partially due to the wear of the roller bearing body. This wear depends to a great extent on the applied level of operational pressure of the machine and thus on the pressure load apart from the wear of the roller bearing itself. One of the most unpleasant side effects of the roller bearings is a high level of noise which is felt to be acutely disturbing. In addition, the roller bearings for the drive shaft due to their unavoidable play cause considerable irregularities in the rotary movement of the shaft which may amount to several tenths of a millimeter relative to the central axis of the bearing. Such an excessive aberration of the rotating shaft with respect to the center of the bearing is undesirable since excessive dynamic loads and vibrations of the driving mechanism necessitate additional tolerances in the high-pressure part of the machine in order to avoid excessive wear.

Many experiments have already been made to support the driving parts of Thoma pumps hydrostatically in order to attain in this manner a quite run of the shaft at a high wear resistance.

One of the largest problems encountered in hydrostatic bearings results from the pulsating loads transmitted from the varying number of pistons under load and such intermittent load condition necessitates sturdy and strongly damped bearings. Another problem is the susceptibility to the leakage of working fluid for the hydrostatic bearing support should be effected by an extremely thin oil film. The reduction of thickness of the bearing oil films requires, however, such a manufacturing accuracy of the parts of the bearing which in practical series production cannot be achieved.

Furthermore, not negligible temperature differences may occur between the drive shaft and the shaft bearing which due to the minute tolerances may result in a seizing tendency in the bearing.

SUMMARY OF THE INVENTION

It is, therefore, a general object of the present invention to overcome the aforementioned disadvantages.

More particularly, it is an object of the invention to provide an improved axial piston machine such as an engine or a pump of the above-described type having a hydrostatic bearing for its drive shaft which under all operational conditions insures a trouble-free hydrostatic support.

In keeping with these objects, and others which will become apparent hereafter, one feature of the axial piston machine of this invention resides in the provision of a conically extended portion of the drive shaft having a base which supports the socket ring, a hydrostatic radial bearing for rotatably supporting the conical portion, throttling means communicating with the hydrostatic radial bearing to deliver a pressure fluid into the latter, means for maintaining a predetermined minimum pressure of the pressure fluid in the bearing which normally is proportional to the working pressure of the machine, and slightly adjustable axial bearing means for axially counteracting the thrust of the drive shaft in the direction of the conically extended portion of the shaft.

It is to be understood that the conical hydrostatic bearing has to be dimensioned such that during the operation of the machine the axial and radial forces applied by the pistons against the shaft is intercepted while the gap between the bearing surfaces (usually between 10 to 40 my) is at least approximately maintained.

The invention makes it possible that during idling operational conditions of the machine a minimum pressure for keeping the hydrostatic bearing fully operable with small forces acting both in the radial and in the axial direction, is always available; if, however, the machine operates under higher loads, that means under a high working pressure, then the hydrostatic bearing is supplied with pressure oil proportionally to the increase of the working pressure and consequently is made in this manner highly wear resistant both in the radial direction and, according to the magnitude of the axially projected area of the conical bearing, also in the axial direction. The resistance to wear of the hydrostatic bearing of this invention is also proportional to the thrust of the pistons in both (radial and axial) directions.

In hydrostatic bearings of this kind, heating effects have considerable influence when high rotational rates and high circumferential speeds are attained. Due to the fact that the size of the oil-filled bearing gap is to be in the range between 10 and 40 my, the different temperatures of respective component parts of the bearing may change the bearing gap beyond the operative tolerances. If the conical portion of the drive shaft is rigidly supported against axial displacement, the resulting temperature differences between the shaft and the housing might bring the radial play to zero and thus make the seizure of the drive shaft unavoidable. The conical hydrostatic bearing according to this invention enables, in contrast to prior-art bearings, an axial displacement of the participating component parts when a non-uniform heating occurs, so that the oil-filled gap between the bearing surfaces is always maintained in proportion to the required flow of the pressure oil. If the bearing clearance or play is diminished in the range of the conical hydrostatic bearing section, the pressure in the bearing gap is increased accordingly and the shaft is shifted to the right in the direction of the conical extension until the bearing gap resumes its initial size. This pressure increase, however, is minimum when the reaction force in the auxiliary axial bearing is held at least approximately constant.

The self-adjustable auxiliary axial bearing includes a hydraulic pressure chamber communicating with an auxiliary pressure fluid source which supplies the chamber with at least approximately constant lower pressure. This flexible arrangement of the axial bearing has the advantage that the drive shaft is in a simple manner urged in axial direction against the conical bearing with a small force irrespective of the forces exerted by the pistons.

The auxiliary flexible axial bearing arrangement is situated at the tapering end of the conical shaft section. The hydrostatic radial bearing for the conical section is supplied with a working fluid via a throttling arrangement which is normally fed with a high pressure fluid. This arrangement is structurally advantageous and particularly simple in design.

The axial hydraulic pressure chamber is supplied with a pressure fluid which is considerably below the normal high pressure of the working fluid of the machine and is generated by an auxiliary pump. If the machine operates at very low pressure, the conical hydrostatic bearing for the shaft can also be supplied with a low-pressure fluid from the same auxiliary pump and as soon as the working pressure of the machine increases this auxiliary pump can be disconnected.

In installations using machines according to this invention, there can be employed as an auxiliary pump a conventional gear or vane pump. The pressure port of the auxiliary pump is connected via a permanently open conduit and a throttle to the pressure chamber, and via a conduit provided with a non-return valve to another throttle arrangement communicating with the conical hydrostatic bearing whereby the conduit from the "Thoma" pump to the throttle arrangement can also be provided with a non-return valve.

If the auxiliary pressure is exceeded by the working pressure of the axial piston machine, the non-return valves automatically connect the pockets of the hydrostatic conical bearing to the high pressure pump and at the same time shut-off the auxiliary pressure system.

The axial auxiliary bearing is also a hydrostatic bearing supplied via the other throttle with the low pressure fluid from the auxiliary pump. The auxiliary pressure system thus supplies with the low pressure fluid both the hydraulic pressure chamber and the hydrostatic axial bearing of the drive shaft. In a further elaboration of this invention the series-connected throttles for the bearing pockets are arranged such as to be capable of operating both during the idling of the machine when the oil is supplied from the auxiliary pressure system, as well as during the high-pressure operation when it is fed with high-pressure fluid from the machine. Preferably, the series-connected throttle for the conical bearing of the shaft is designed such that the pressure in the pockets formed in the gap of the hydrostatic bearing when the shaft is in its intermediate position, corresponds approximately to the half of the incoming high pressure. The static construction of the bearing surfaces and levers is with advantage made such that the pressure in the pockets equalizes forces both in the radial and in the axial directions.

During the idling of the machine the axial bearing of the drive shaft is supplied with low pressure oil from the auxiliary pressure system in the same manner as the pockets of the radial bearing on the conical shaft section. In this manner it is insured that during this idling condition of the machine the shaft bearing is supplied with strongly decreasing pressure matching the reduced driving forces. Despite the minimum load, the bearing of this invention has a high rigidity also in its central unloaded position and a good damping quality. The dynamic forces in the bearing can be excellently controlled even at high rotational speeds and consequently a quiet run of the machine is attained.

If the working pressure exceeds the auxiliary pressure, the conical bearing (having preferably eight bearing pockets) is automatically supplied with oil the pressure of which is proportional to the high working pressure of the machine and the auxiliary pump is automatically disconnected.

By virtue of the design of the hydrostatic bearings having a pocket pressure which is only about one-half of the high pressure, an increases resistance of the bearing against eccentric or axial displacements of the shaft is insured. Due to the proportionality of the flow of the oil through the bearing pockets to the third power of the size of the oil gap and of the discharge passages of the hydrostatic bearing, the pocket pressure changes very sensitively in response to each minute radial or axial displacement of the shaft. In this manner, an exact oil gap is automatically adjusted in the conical bearing, independently from the magnitude of the high pressure and independently from the rotational speed. This oil gap can be changed only by changing the pressure components in the axial and radial direction resulting from the change of the tilting angle. The change of the radial gap in the hydrostatic bearing is desirable during the decreasing tilting angle inasmuch as the reduced amount of the discharged flow from the axial piston machine necessitates the reduction of the flow of oil through the conical bearing attained by reducing the running play. The reduction of the running play is attained automatically by the increased axial component of the piston when the tilting angle decreases so that the conus is pressed further into the bearing.

The reduction of the running play caused by this axial movement of the drive shaft initiates immediately a pressure increase in the bearing pockets, resulting again in a clearly defined increase of the axial pressure component in the conical bearing until a balance of axial forces is re-established.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a sectional side view of an axial piston pump according to this invention taken along the axis of the drive shaft perpendicularly to the axis of tilting of the cylinder barrel, whereby the oil supply for the hydrostatic bearing is illustrated schematically; and FIG. 2 shows on an enlarged scale the left-hand upper part of the pump of FIG. 1.

DESCRIPTION OF THE PREFERRED EMBODIMENTS

The illustrated "Thoma" pump includes a conventional housing 1 closed by a cover 2. Within the housing, a cylinder barrel 5 accommodating a cylinder block 4 is tiltably supported to tilt about an axis 3 extending perpendicularly to the plane of the drawing. The tilting support of the barrel 5 is known from prior art "Thoma" pumps and need not be described in detail. The cylinder block 4 is rotatably supported in the barrel 5 to rotate about an axis 8 passing through the intersection point of the shaft axis 6 and the tilting axis 3 of the barrel. A universal link 9 coaxially arranged with the axis 8 of the cylinder barrel 4 acts as a shaft of rotation of the latter. The cylinder block 4 defines a plurality of cylindrical borings 11 arranged in a circle around the axis 8. The cylindrical borings communicate via inlet and outlet ports 12 with a pressure fluid supply system which is of a conventional design and need not be described in detail.

The universal link or shaft 9 has its both ends in the form of balls. One ball-shaped end is linked in a corresponding central socket in control plate 13 forming the bottom of barrel 5 and the opposite end ball end is enclosed in a corresponding spherical socket formed in the intersection point of axes 3, 6 and 8. As it will be explained below, this intersection point is a center of a socket ring formed in the base of the conically extended bearing portion of drive shaft 7. The number of sockets in the socket ring corresponds to the number of cylinders 11 in the cylinder block 4, such as for example, six sockets which are uniformly distributed on a circle about the intersection point of axes 6 and 3. As seen from the drawing, pistons 16 arranged for reciprocating axial movement in respective cylindrical borings 11 are joined to piston rods 15 which are provided at their free ends with ball-shaped heads engaging the respective spherical sockets of the socket ring to form therewith ball-and-socket universal joints. Similar ball-and-socket joints are provided between the spherical heads at the other end of piston rod 15 and the non-illustrated sockets within the hollow cylindrical pistons 16.

The above-described construction of the example of an axial piston machine is known from the prior art. In contrast to this invention, however, prior-art machines are provided with radial- and thrust-roller bearings for rotatably supporting the drive shaft.

According to this invention, drive shaft 7 is supported in a hydrostatic bearing block 21 which is held in position in a boring 20 of housing 1 extending concentrically with axis 6 of shaft 7. In order to prevent any axial displacement of the bearing block from the boring 20, the block 21 abuts via a spacing ring 23 against a bearing cover 24 which is held in a fixed position relative to housing 1 by means of a snap ring 22.

The bearing block 21 has a conical boring which hydrostatically supports for rotation the conical section 26 of drive shaft 7. For this purpose, the conical boring in the bearing block 21 is provided with a set of four recessed oil pockets 28 uniformly distributed along a circumferential portion of the conical recess near its extended base, and with another set of four recessed oil pockets 29 uniformly arranged along a circumferential portion of the conical boring near the reduced outer base thereof. These recessed oil pockets 28 and 29 insure that the conical bearing portion 26 formed on the drive shaft 7 is extremely resistant against bending forces exerted against the shaft.

The two groups of bearing sockets 28 and 29 communicate through passages 30 and 31 with annular grooves 32 formed on the periphery of the cylindrical bearing block 21. Both sides of groove 32 are sealed by O-rings 33 and 34 against any leakage of the high-pressure fluid. Separate connections of the passages 30 and 31 with the annular groove 32 are made by means of a nipple 35 which at its outlet into the groove is connected to a capillary pipe 36 extending circumferentially along the wall of the boring in the bearing block 21 to act as a series-connected throttle for the hydrostatic bearing. In this manner during the normal operation of the machine the pressure supplied through the capillary pipe 36 is reduced according to the design of the capillary pipe approximately to half of the original pressure.

Pressure oil flowing into the bearing gap between conical body 26 and the bearing block 21 at both sides of each group of pockets 28 and 29. From the group 28, it flows to the right into the interior of housing 1 and to the left into an annular passage 37 formed between a central part of the conical portion 26 and the juxtaposed surface portion of the bearing block 21. This annular passage 37 communicates with a discharge channel 38 which also opens into the interior of housing 1. From the other group 29 of bearing pockets the bearing oil flows to the right into the annular passage 37 and to the left into an annular recess 39 provided at the smaller base of the conical boring 20 of the bearing block 21 as shown in greater detail in FIG. 2. This annular recess 39 also communicates through a passage 40 with discharge passage 38. As is schematically illustrated in FIG. 1, the high-pressure oil is fed into the annular groove 32 through a condiut 42 leading from the high-pressure part of the "Thoma" pump 4, 11. The high-pressure oil conduit 42 includes a non-return valve 43 which when pressure in the annular groove 32 exceeds the pressure delivered by the "Thoma" pump 4, 11 shuts off the supply of pressure oil from the auxiliary pumps 45 and thus prevents the return flow to the "Thoma" pump.

As can also be seen from FIG. 1, the conduit 42 which feeds via the annular groove 32 the hydrostatic bearing of this invention with high-pressure oil is further connected between the groove 32 and the non-return valve 43 to an auxiliary supply conduit 44 connected via a non-return valve 47 to an auxiliary pump 45 which normally serves for the control of the main "Thoma" pump 4, 11. Under normal operational conditions of the machine, the auxiliary pump 45 delivers a pressure in the range of approximately 10% of the maximum working pressure of the "Thoma" pump. The non-return valve 47 in the conduit 44 prevents the return flow of the pressure oil from the groove 32 when the pressure in conduit 42 is larger than that delivered by the auxiliary pump 45 which normally is a substantially constant low pressure.

At the left side of the annular groove 32 there is provided in the bearing block 21 an additional annular groove 50 which communicates through a branch conduit 48 with the auxiliary pump 45 so that the additional groove 50 is supplied with oil under the pressure of the auxiliary pump. The additional annular groove 50 is sealed at both sides thereof by O-rings 51. Similarly as in the first-mentioned groove 32, a capillary pipe 53 extends in the additional annular groove 50 and is connected through a nipple 54 to a passage 55 which admits the constant low-pressure fluid from the auxiliary pump into the hydrostatic axial auxiliary bearing, in this example an oil pocket 56. This axial bearing is designated as an auxiliary bearing for the reason that if the machine operates under ideal operational conditions it is unnecessary, nonetheless, during an idling operation of the machine when the strokes of axial pistons keep the conical part 26 of the shaft in its position in the hydrostatic bearing block, the auxiliary axial bearing limits the axial displacement of the drive shaft 7. The axial auxiliary bearing includes an annular bearing pocket 56 formed on the outer face of the bearing block 21. The pocket 56 is supplied via the passage 55 with the low-pressure oil from the additional annular groove 50 and opens into a bearing gap 57 extending radially outwardly in a plane perpendicular to the axis 6 into an annular space 59 and radially inwardly into an annular space 39. The outer annular space 59 communicates via passage 60 with a discharge passage 38.

As can be seen from FIG. 2, the bearing gap 57 of the hydrostatic axial auxiliary bearing is limited to the right by the bearing block 21 and to the left by a bearing flange 61 supported for joint rotation on the shaft 7. More specifically, the bearing flange 61 is seated on a shoulder 63 at the left-hand portion of the shaft 7 and is spaced apart from the smaller base of the conical bearing portion 26 by a spacing ring 62. The spacing ring 62 is exchangeable and serves for a very fine adjustment of the bearing gap in the hydrostatic bearing between the conical part 26 and the bearing block 21.

In order to provide for an automatic fine adjustment of the axial position of the conical hydrostatic bearing which may be necessitated, for example, by the effect of temperature changes, there is provided an annular hydraulic pressure chamber 65 surrounding the shoulder 63 of shaft 7. The annular pressure chamber 65 is bounded to the right by the bearing flange 61 and, in axial direction to the left, by a supporting collar 66. In the inward radial direction, it is limited by the shoulder 69 and sealed against the pressure fluid by two O-rings. Radially outwardly it is limited by an outwardly directed projection 67 of the bearing flange 61 and is also sealed against the supporting collar 66 by a sealing O-ring. The hydraulic pressure chamber constitutes, therefore, in principle, an annular cylinder piston arrangement. The passage 68 opening into the annular pocket 56 serves for admitting pressure fluid into the pressure chamber 65, this pressure fluid having a reduced pressure resulting from the throttling of the pressure oil in the capillary pipe 53 acting also as a throttle for the axial auxiliary bearing 56.

The bearing flange 61 is secured against rotation relative to the supporting collar 66 by hollow cylindrical pins 73 extending between juxtaposed recesses provided in the facing surfaces of the bearing flange 61 and of the supporting collar 66 and being uniformly distributed around the axis 6. The supporting collar 66 is also secured by conventional fastening means 71 to the drive shaft 7 to rotate therewith and in addition it is protected against axial displacement by a retaining ring 70. The hollow cylindrical pins 73 form sockets open at one side for receiving pressure springs 77, the combined axial spring force of which is substantially lower than the axial pressure exerted by the pressure fluid in the pressure chamber 65. The springs 77 serve merely for preventing the formation of an excessively wide bearing gap in the conical bearing of the shaft 7 when the machine is started.

Preferably, the angle of the conical bearing surface when employed in a machine having maximum auxiliary pressure of about 50 bars and a maximum operative pressure of the axial pistons of about 400 bars, is about 18°. The radial play of the conical bearing is preferably between 20 and 30 my. The axial gap 57, 58 of the axial auxiliary bearing 56 has a pressure of about 50 bars or preferably about 40 my.

The operation of the machine is as follows:

During an idling run, the "Thoma" pump 4, 11 does not practically deliver any pressure, only the auxiliary pump 45 delivers a constant low pressure. The pressure fluid under this low pressure of about 50 bars flows through conduit 44, non-return valve 47 and the conduit 42 into the annular groove 32 and therefrom is distributed into the respective groups of bearing pockets 28 and 29. The minute bearing pressure is fully sufficient for the idling operation since the bearing is under minimum load. In addition, the pressure fluid from the auxiliary pump 45 flows through conduits 44 and 48 into the additional annular groove 50 and therefrom into the annular axial bearing pocket 56 of the axial auxiliary bearing so that even the latter is completely hydrostatically operative without any solid contact. Finally, the low pressure fluid from the auxiliary pump 45 upon its reduction in the series-connected throttle 53 is admitted through boring 68 into the hydraulic pressure chamber 65 which exerts a certain axial pressure affecting the axial displacement of the bearing cone 26 into the conical boring 20 of the bearing block 21. This action enables the machine to run flawlessly under the hydrostatic bearing support of this invention at a negligible consumption of energy. If the tilting barrel 5 is tilted relative to the axis 6, so that the piston pump starts delivering and consuming power, no change in the operative conditions occurs until the high pressure generated by the "Thoma" pump 4, 11 exceeds the auxiliary pressure generated by the auxiliary pump 45. At this moment, the high pressure from the pump 4, 11 opens the non-return valve 43 which until now has been closed by the pressure from the auxiliary pump 45 and this high pressure propagates through the conduit 44 against the non-return valve 47 and closes the latter. Furthermore, the high-pressure oil streams through the conduit 42 into the annular groove 32 in the bearing block 21 and therefrom the hydraulic conical bearing of the shaft is supplied with the high-pressure oil.

At the same time, the play of the conical hydrostatic bearing adjusts itself to an optimum value resulting from the appropriate dimensioning of the bearing. At one side the pressure of the working fluid tends to axially displace the conical part 26 of the shaft out of the conical boring 20 and on the other side the force of the pistons counteracts the displacement and pushes the conical part 26 back.

If this balance of forces is disturbed, for example due to an excessive heating of the cone 26 and of the conical hydrostatic bearing socket 20 in the bearing block 21, the necessary axial compensation of the displacement caused by the heating is made possible by the hydraulic pressure chamber 65. More particularly, if pressure in the conical hydrostatic bearing increases as the result of the reduction of the bearing gap between the conical part 26 and the conical boring 20, axial components of this increased pressure overbalance the pressure in chamber 65 which raises at a slower rate and displace the bearing cone 26 together with the supporting collar 66 to the right. This axial displacement of the cone 26 relative to the bearing block 21 reduces the pressure in hydraulic pressure chamber 65 and in this manner the bearing gap in the conical hydrostatic bearing of this invention is held practically constant.

The various operational conditions of the axial piston machine, accordingly, can be accomplished by the fact that the axial auxiliary bearings 56–58 and the hydraulic pressure chamber 65 are permanently under the pressure of the auxiliary pump 45, whereas the conical hydrostatic radial or main bearing is under the pressure of the auxiliary pump only during an idling run or when subject to a minimum load when the pressure from the high-pressure pump 4, 11 is lower than the pressure of the auxiliary pump so that the lower pressure is admitted to the hydrostatic bearing. As soon as the practically constant low pressure from the auxiliary pump is exceeded by the high pressure of the fluid delivered by the pump 4, 11, the series-connected throttle 36 adjusts the incoming high pressure supplied into the hydrostatic bearing to be equal or proportional to the operational pressure of the machine.

It will be understood that each of the elements described above, or two or more together, may also find a useful application in other types of constructions differing from the types described above.

While the invention has been illustrated and described as embodied in an axial piston pump, it is not intended to be limited to the details shown, since various modifications and structural changes may be made without departing in any way from the spirit of the present invention. For example, the hydrostatic axial and radial bearings of this invention can be applied not only in hydrostatic axial pumps, but also in hydrostatic axial engines.

Without further analysis, the foregoing will so fully reveal the gist of the present invention that others can be applying current knowledge radily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An axial piston machine, such as axial piston pump or axial piston engine, comprising a drive shaft; a socket ring secured to one end of said drive shaft; a rotary cylinder block having its axis of rotation inclined relative to the axis of said drive shaft; a plurality of cylinder-and-piston units arranged in said cylinder block and each having a piston rod linked to said socket ring by universal ball-and-socket joints; hydrostatic radial bearing means for said drive shaft including a bearing block having a conical boring surrounding a portion of said drive shaft and a conical bearing member integral with said drive shaft portion in said boring and defining a gap therebetween; throttling means opening into said gap to deliver a pressure fluid therein, the pressure of said fluid being proportional to the working pressure of said machine; means for maintaining a predetermined minimum pressure of said pressure fluid; and self-adjusting hydrostatic axial bearing means acting in the axial direction against the expanding sloping surface of said conical part.

2. The machine as defined in claim 1, wherein said self-adjusting axial bearing means includes an axial hydrostatic bearing gap extending between said drive shaft and said bearing block in a plane perpendicular to the axis of said drive shaft, a hydraulic pressure chamber extending parallel to said axial bearing gap and being adjustable in axial direction of the drive shaft, and means for delivering an auxiliary pressure from said axial hydrostatic bearing gap into said hydraulic pressure chamber.

3. The machine as defined in claim 2, wherein said self-adjusting axial bearing means includes an annular flange supported for joint rotation on said drive shaft near the tapered end of said conical bearing member, said annular flange facing the end face of said bearing block to define said axial bearing gap therebetween and further including a bearing pocket communicating with an external source of auxiliary low pressure fluid.

4. The machine as defined in claim 3, wherein said radial hydrostatic bearing means includes a plurality of bearing pockets uniformly formed in the inner wall of said conical boring and communicating via said throttling means with an external source of a high-pressure fluid for the machine.

5. The machine as defined in claim 4, wherein said source of an auxiliary low pressure fluid has a substantially constant pressure lower than the operational high pressure of said machine, and means for delivering said auxiliary pressure fluid into said axial bearing gap and therefrom into said hydraulic pressure chamber.

6. The machine as defined in claim 5; further including pressure relieving means for semidirectionally delivering the auxiliary low pressure fluid into said radial hydrostatic bearing means when the source of said high-pressure fluid operates at a pressure which is lower than said auxiliary pressure fluid.

7. The machine as defined in claim 5, wherein said source of the auxiliary low pressure fluid is directly connected via the throttling member to said pressure chamber and further is connected via a non-return valve to the supply conduit of the high-pressure fluid connected via another throttling member to said radial hydrostatic bearing gap, said supply conduit for the high-pressure fluid being connected to said source of said high-pressure fluid via an additional non-return valve to prevent reverse current of said high-pressure fluid when the pressure in said auxiliary pump exceeds the pressure of the high-pressure fluid.

8. The machine as defined in claim 7; further including a housing for supporting said bearing block and for enclosing said tiltable cylinder block, said bearing block defining on its periphery two annular grooves, one of said grooves being connected via said one throttling member to said radial hydrostatic bearing and communicating with the supply conduit for said high-pressure fluid, the other annular groove being connected via said other throttling member to said hydrostatic axial bearing and to said hydraulic pressure chamber and communicating with the supply conduit for the auxiliary low-pressure fluid from said auxiliary pump.

9. The machine as defined in claim 8, wherein said axial hydrostatic bearing gap defines an annular bearing pocket formed in the end face of said bearing block and communicating with said other annular groove, and said pressure chamber communicating with said bearing pocket.

10. The machine as defined in claim 9, wherein said axial hydrostatic bearing gap is provided with two groups of bearing pockets in the form of recessed portions in the inner wall of said conical boring of said bearing block, said recessed portions in each group of pockets being uniformly distributed along corresponding circumferential portions of said conical boring.

* * * * *